United States Patent [19]

Tsutsumi et al.

[11] Patent Number: 4,818,496
[45] Date of Patent: Apr. 4, 1989

[54] APPARATUS FOR TREATING A SULFUR DIOXIDE-CONTAINING GAS

[75] Inventors: Hiroshi Tsutsumi, Kitakyushu; Morihito Okamura; Osamu Matsunaga, both of Tochigi, all of Japan

[73] Assignee: Mitsui Mining Company, Limited, Tokyo, Japan

[21] Appl. No.: 899,141

[22] Filed: Aug. 22, 1986

[30] Foreign Application Priority Data

Sep. 13, 1985 [JP] Japan ................... 60-201704

[51] Int. Cl.⁴ .................. F01N 3/10; B01D 53/34
[52] U.S. Cl. ..................... 422/172; 422/177; 422/182; 423/574 R
[58] Field of Search ............ 422/168, 170, 172, 177, 422/182, 183, 194, 216; 423/569, 574 R

[56] References Cited

U.S. PATENT DOCUMENTS

| | | | |
|---|---|---|---|
| 2,001,274 | 5/1935 | Haub | 126/182 |
| 2,043,202 | 6/1936 | Merriam | 422/216 |
| 2,320,318 | 5/1943 | Simpson et al. | 422/216 |
| 3,773,894 | 11/1973 | Bernstein et al. | 422/170 |
| 3,775,064 | 11/1973 | Berger et al. | 422/172 |
| 4,207,292 | 6/1980 | Bischoff et al. | 422/216 |
| 4,504,459 | 3/1985 | Stothers | 422/216 |

Primary Examiner—Benoit Castel
Attorney, Agent, or Firm—Wenderoth, Lind & Ponack

[57] ABSTRACT

A sulfur dioxide-containing gas, for example, one obtained by an $SO_x$ and $NO_x$ removing process using ammonia is treated by the use of a reaction apparatus comprising a reducing reaction portion and a composition controlling oxidation reaction portion, provided in the same reactor or reactors adjacent to each other, to convert the composition of the gas into one suitable for the Claus reaction.

4 Claims, 2 Drawing Sheets

FIG. 1
FIG. 2
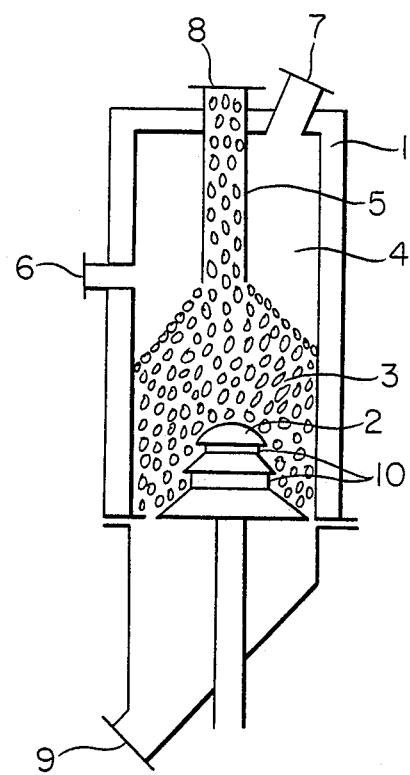
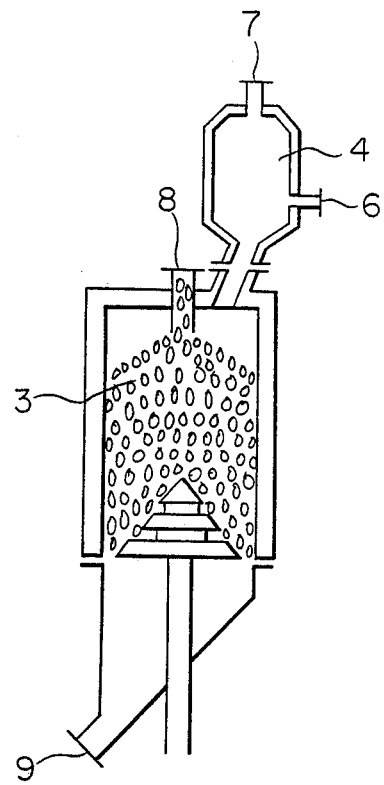

APPARATUS FOR TREATING A SULFUR DIOXIDE-CONTAINING GAS

BACKGROUND OF THE INVENTION

1. Field of the Invention

This invention relates to a process for the production of sulfur from a sulfur dioxide-containing gas and more particularly, it is concerned with a process for treating a sulfur dioxide-containing gas to convert it into a composition suitable for the Claus reaction process and an apparatus therefor.

2. Description of the Prior Art

Production of elementary sulfur by a dry process comprising reducing sulfur dioxide in a sulfur dioxide-containing gas with a reducing gas to sulfur, hydrogen sulfide, etc. and then obtaining elementary sulfur using a condenser and Claus reactor has hitherto been carried out by bringing the sulfur dioxide-containing gas into contact with a carbonaceous material such as coal, reducing and directly obtaining elementary sulfur, or by reducing sulfur dioxide in the sulfur dioxide-containing gas to form hydrogen sulfide and then subjecting the resulting mixed gases of hydrogen sulfide and sulfur dioxide in a proportion of 2 : 1 to the Clauss reaction to obtain sulfur.

In these processes, there have been proposed various methods of preparing raw material gases for the Claus reaction, typical of which are as follows:

(1) Method comprising contacting a sulfur dioxide-containing gas with a carbonaceous material to reduce a part of sulfur dioxide and thus adjusting a ratio of hydrogen sulfide and sulfur dioxide to 2 : 1 (Japanese Patent Application OPI (Kokai) No. 167107/1982), (2) Method comprising dividing a sulfur dioxide-containing gas into two parts with a volume ratio of 2 : 1, reducing wholly the part with the larger volume ratio to hydrogen sulfide and mixing this with the other part to adjust a ratio of hydrogen sulfide and sulfur dioxide to 2 : 1 (Japanese Patent Application OPI (Kokai) No. 32307/1981) and (3) Method comprising reducing a part or all of sulfur dioxide in a sulfur dioxide-containing gas to obtain a gas containing an excessive amount of hydrogen sulfide and then subjecting the gas to partial combustion in a combustion furnace provided according to the method employed in the desulfurization process for the ordinary petroleum refining process to adjust the ratio of hydrogen sulfide and sulfur dioxide to 2 : 1.

The above described methods (1) to (3) respectively have the following disadvantages:

(1) It is difficult to hold the ratio of hydrogen sulfide and sulfur dioxide constant by controlling the reducing reaction.

(2) An installation for by-pass is required. A gas containing sulfur dioxide in a high concentration, obtained by an $SO_x$ and $NO_x$ removal process using ammonia, contains ammonia in a proportion of up to 1.0% in some cases. When this gas via by-pass is mixed and used as it is, there is the possibility of adversely affecting the Claus reaction process.

(3) Since the sulfur dioxide-containing gas is reduced, part of the gas is then fed to a combustion furnace the temperature of which is maintained by the combustion of liquefied petroleum gas and subjected to conversion into sulfur dioxide by feeding air in an excessive amount, thereby controlling the ratio of hydrogen sulfide and sulfur dioxide, it is necessary to install the combustion furnace for controlling the composition and the amount of the gas to be processed is increased because of the use of the excessive air, thus lowering the concentration of the reaction components and the efficiency of the Claus reaction.

SUMMARY OF THE INVENTION

It is an object of the present invention to provide an apparatus for the production of sulfur from a sulfur dioxide-containing gas.

It is another object of the present invention to provide for treating a sulfur dioxide-containing gas to convert the composition thereof into that suitable for the Claus reaction.

It is a further object of the present invention to provide an apparatus for treating a sulfur dioxide-containing gas.

These objects can be attained by a process for treating a sulfur dioxide-containing gas, wherein the sulfur dioxide-containing gas is treated by the use of a reaction apparatus comprising a reducing reaction means and a composition controlling oxidation reaction means to convert the composition into one suitable for the Claus reaction by controlling the $H_2S$ to $SO_2$ ratio in the sulfur dioxide-containing gas to 2:1, and by an apparatus for treating a sulfur dioxide-containing gas comprising a reducing reaction means and a composition control oxidation reaction means in the same reactor.

BRIEF DESCRIPTION OF THE DRAWINGS

The accompanying drawings illustrate the principle and merits of the present invention.

FIG. 1 is a schematic view of one embodiment of an apparatus for treating a sulfur dioxide-containing gas according to the present invention.

FIG. 2 is a schematic view of another embodiment of an apparatus for treating a sulfur dioxide-containing gas according to the present invention.

DETAILED DESCRIPTION OF THE INVENTION

Figure 3:
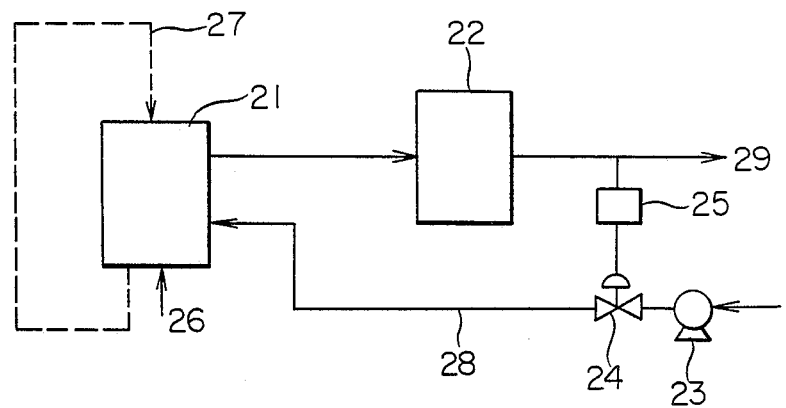
FIG. 3 is a flow diagram to illustrate a process for producing sulfur from a sulfur dioxide-containing gas by the Claus reaction using an apparatus for treating a sulfur dioxide-containing gas according to the present invention.

The inventors have made various efforts to overcome the disadvantages of the prior art as described above and consequently, have found that the use of an apparatus comprising a reducing reaction part and a composition controlling reaction part in the same reactor is more effective for this purpose. Accordingly, the present invention provides a process and an apparatus for treating a sulfur dioxide-containing gas to convert the composition thereof into one suitable for the Clauss reaction using a reaction apparatus comprising a reducing reaction means and a composition controlling oxidation reaction means.

The feature of the apparatus for treating a sulfur dioxide-containing gas according to the present invention consists of a reaction portion for controlling the composition of the sulfur dioxide-containing gas by oxidation, is provided adjacently to a reducing reaction zone for reducing sulfur dioxide to sulfur, hydrogen sulfide carbonyl sulfide and the like or in the same reactor having the reducing reaction zone.

In the present invention, carbonaceous materials such as coal and coke and reducing gases such as carbon monoxide and hydrogen can be used as a reducing agent and air or other oxygen-containing gases can be used as an oxidizing agent. Above all, it is preferable to use coke as a reducing agent and air as an oxidizing agent.

The present invention will now be illustrated in detail as to preferred embodiments. FIG. 1 shows one embodiment of an apparatus for treating a sulfur dioxide-containing gas according to the present invention. Referring to FIG. 1, a sulfur dioxide-containing gas is fed to a treating apparatus 1 from a raw material gas inlet 10, brought into contact with a carbonaceous material at a temperature distribution of 600 to 1000° C. in a reducing reaction zone 3 filled with the carbonaceous material and about 80 to 100% of sulfur dioxide in the raw material gas is reduced to sulfur, hydrogen sulfide, carbonyl sulfide, etc. The reducing reaction zone 3 is a reactor of the moving bed type filled with a carbonaceous material which is fed from a carbonaceous material inlet 8 via a carbonaceous material charging chute 5. The resultant ash and non-fired carbonaceous material pass through a gap between the inner wall of the reducing reaction zone 3 at the bottom and a grate 2, fall down in an ash and non-fired carbonaceous material discharge chute connected with the reactor and is then discharged from an exhaust port 9 at the lower part of the chute. Grate 2 is for discharging the carbonaceous material.

The temperature of the reducing reaction zone 3 can be maintained by feeding air or an oxygen-containing gas individually or with the raw material gas to thus burn a part of the reducing agent.

The thus reduced gas is partially oxidized by air fed from an air inlet 6 in a composition controlling reaction zone 4 (combustion chamber) provided above the reducing reaction zone 3 preferably at a temperature of 500 to 900° C. to form sulfur oxide, whereby the ratio of hydrogen sulfide and sulfur dioxide, i.e. the value of $(H_2S+COS+0.5CS_2)/SO_2$ is adjusted to 1.50 to 2.50, preferably 1.90 to 2.10, suitable for the Claus reaction, and then discharged as a raw material gas for the Claus reaction from a gas outlet 7. The rate of the oxidation reaction can be freely controlled by changing the quantity of air supplied.

FIG. 2 shows another embodiment of an apparatus for treating a sulfur dioxide-containing gas according to the present invention, in which a composition controlling reactor is adjacent to a reducing reactor and numerals correspond to those of FIG. 1.

In the case of using a mixture of a carbonaceous material and a reducing gas, the apparatus of FIG. 1 and FIG. 2 can be used as it is, and the reducing gas is generally fed with a sulfur dioxide-containing gas from the gas inlet 10. In the case of using only a reducing gas, the temperature should be maintained by burning a part of the reducing gas or fuel by a burner.

One example of a process for treating a sulfur dioxide-containing gas according to the present invention will in detail be illustrated referring to FIG. 3. In FIG. 3, a sulfur dioxide-containing gas 26 fed to an apparatus 21 for treating a sulfur dioxide-containing gas, comprising a reducing reaction zone and a composition controlling oxidation reaction zone, the reducing reaction portion containing a carbonaceous material which is moved and circulated along flow line 27, and causes partial or complete reduction of sulfur dioxide in the reducing reaction part, the reduced gases of which are then oxidized again in the composition controlling reaction zone to give a composition suitable for the Claus reaction, subjected to removal of by-produced sulfur in a condenser (not shown) and then fed to a Claus reactor 22. The condenser can be omitted. Air provided along flow line 28 for the composition controlling reaction is controlled by means of a control valve 24 for controlling the rate of air flow in response to the value of $H_2S$, etc./$SO_2$ in a tail gas flowing in line 29 of the Claus reaction by an analysis meter 25 and is then fed to the apparatus 21 for treating a sulfur dioxide-containing gas.

Figure 4:
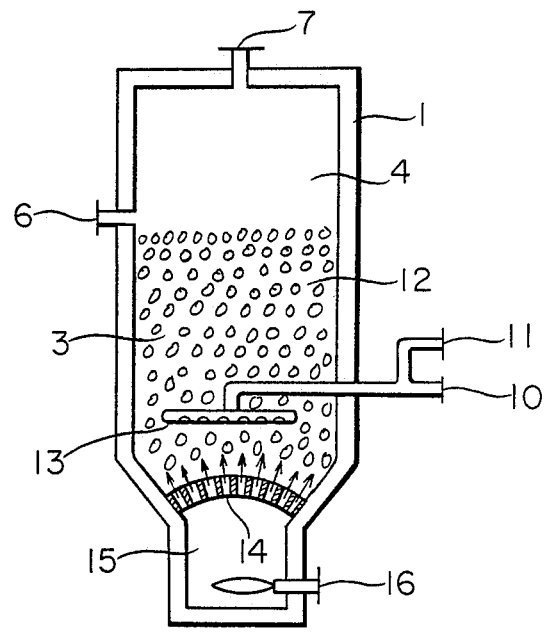
FIG. 4 is a schematic view of a further embodiment of an apparatus for treating a sulfur dioxide-containing gas according to the present invention.

FIG. 4 shows a further embodiment of an apparatus for treating a sulfur dioxide-containing gas according to the present invention, comprising a raw material gas inlet 10, reducing gas inlet 11, packing 12 such as broken brick, gas injection pipe 13, fire grate 14, combustion chamber 15 and burner 16.

The process and apparatus of the present invention have the following advantages over the prior art:

(1) Since the reducing reaction and composition controlling can be carried out in a single reactor or in a series of reactors provided adjacently, it is not required to further provide a combustion furnace for controlling the composition. Therefore, a supply of air for the combustion of liquefied petroleum gas, etc. is not required, so there is no increase of the process gas and a higher concentration of the reaction components in the gas can be maintained. Furthermore, the contact time with a catalyst in a Claus reactor can be lengthened so that a higher recovery efficiency of sulfur can be attained, and the tail gas of the Claus reaction is decreased, resulting in ease of the subsequent handling.

(2) A temperature of 500 to 800° C. can readily be maintained by the combustion of combustible components in the reduced gas without using fuels such as liquefied petroleum gas.

(3) Since it is possible to control the furnace temperature in the composition controlling reaction zone and composition of the raw material gas for the Claus reaction by controlling only the quantity of air for composition control, control of the operation and composition is easy.

(4) A sulfur dioxide-containing gas obtained by an $SO_x$ and $NO_x$ removal dry process using ammonia contains ammonia in an amount of up to 1% in some cases, but according to the present invention, the whole quantity of the gas can be treated in the apparatus for treating a sulfur dioxide-containing gas, so the ammonia is substantially decomposed to give a low concentration, e.g. 500 to 1500 ppm in a stable manner and the subsequent Claus reaction is hardly affected adversely.

(5) A sulfur dioxide-containing gas obtained by an $SO_x$ removal or $SO_x$ and $NO_x$ removal process contains a micro amount of sulfur trioxide, but this sulfur trioxide can be reduced by treating the whole quantity of the gas by means of a reducing reactor according to the present invention and thus corrosion problems due to formation of sulfuric acid can be prevented in the subsequent processes.

The following example is given in order to illustrate the present invention without limiting the same.

EXAMPLE 1

Using an apparatus for treating a sulfur dioxide-containing gas as shown in FIG. 1 and coke as a reducing agent, a raw material gas having a composition of 20-25% $H_2O$, 20-25% $SO_2$, 25-35% $N_2$ and 20-30% $CO_2$ was treated to produce sulfur according to the process as shown in FIG. 3. The apparatus for treating a sulfur dioxide-containing gas was operated under conditions of: a gas flow rate of 40 to 50 $Nm^3$/hr, reducing reaction zone temperature distribution was 700 to 800° C. (which was maintained by feeding air from the gas inlet 10 and burning the reducing agent) and composition controlling reaction zone temperature distribution was 600 to 700° C. and thus the raw material gas for the Claus reaction was controlled to give an $H_2S$ etc.-/$SO_2$ ratio of 1.95 to 2.05. Sulfur was prepared with a yield of 90 to 95% and a purity of elementary sulfur of at least 99.99%.

EXAMPLE 2

The procedure of Example 1 was repeated except that a raw material gas having a composition of 40–45% $H_2O$, 25–30% $SO_2$, 15–20% $N_2$ and 10–15% $CO_2$ was treated at a gas flow rate of 55 to 60 $Nm^3$/hr, reducing reaction zone temperature distribution was 800 to 1000° C. and the composition controlling reaction zone temperature distribution was 700 to 850° C., thus obtaining results of an $H_2S$ etc./$SO_2$ ratio of 1.95–2.05, sulfur recovery yield of 93–97% and sulfur purity of at least 99.99%.

EXAMPLE 3

Using an apparatus for treating a sulfur dioxide-containing gas as shown in FIG. 4 and a coke oven gas having a composition of 55% $H_2$, 30% $CH_4$, 7% CO, 1% $O_2$ and the balance $N_2$ and $CO_2$, a raw material gas having a composition of 20-25% $H_2O$, 20-25% $SO_2$, 25-35% $N_2$ and 20-30% $CO_2$ was treated to produce sulfur according to the process as shown in FIG. 3. The apparatus was operated under conditions of: flow rate of the raw material gas of 8 $Nm^3$/hr, reducing reaction zone temperature distribution was 700 to 800° C. and composition controlling reaction zone temperature distribution was 600 to 700° C. and thus the raw material gas for the Claus reaction was controlled to give an $H_2S$, etc./$SO_2$ ratio of 1.95 to 2.05. Sulfur was produced with a yield of 91 to 95% and a purity of elementary sulfur of at least 99.99%.

What is claimed is:

1. An apparatus for treating a sulfur dioxide-containing gas, comprising, in combination, a reducing reaction means and a composition controlling oxidation reaction menas, in which a sulfur dioxide-containing gas is reduced and a part of the resulting sulfur and hydrogen sulfide is then oxidized to convert the composition of the gas into that suitable for the Claus reaction, wherein:

the reducing reaction means comprise a reaction chamber of a carbonaceous material moving bed type provided in a reactor, having at a lower part of the reaction chamber a grate having a raw material gas inlet for feeding the raw material gas containing sulfur dioxide into the reaction chamber and a raw material gas feed pipe provided to the bottom of the grate, a discharge chute fitted to the lower part of the reactor for receiving resultant ash and non-fired carbonaceous material through a gap between the grate and the side wall of the reactor and discharging through an exhaust port, and a carbonaceous material charging chute for charging a carbonaceous material into the reaction chamber through a carbonaceous material inlet provided at the upper part of the reactor, and the composition controlling oxidation reaction means comprising a combustion chamber, provided above and in flow communication with said reaction chamber in the same reactor, having an air inlet for feeding air to said combustion chamber to oxidize the reduced gas from said reaction chamber and a gas outlet for discharging a composition-controlled gas suitable for the Claus reaction.

2. An apparatus for treating a sulfur dioxide-containing gas, comprising, in combination, a reducing reaction means and a composition controlling oxidation reaction means, in which the sulfur dioxide-containing gas is reduced and a part of the resulting sulfur and hydrogen sulfide is then oxidized to convert the composition of the gas into that suitable for the Claus reaction, wherein:

the reducing reaction means and composition controlling oxidation reaction means are respectively a reducing reactor and composition controlling oxidation reactor, provided adjacently to each other and the reducing reactor comprising a chamber of a carbonaceous material moving bed type having at a lower part of the chamber a grate having a raw material gas inlet for feeding the raw material gas containing sulfur dioxide into the chamber and a raw material gas feed pipe provided to the bottom of the grate, a discharge chute fitted to the lower part of the reducing reactor for receiving resultant ash and non-fired carbonaceous material through a gap between the grate and the side wall of the reducing reactor and discharging through an exhaust port, a carbonaceous material charging chute for charging a carbonaceous material into the chamber through a carbonaceous material inlet provided at an upper part of the reducing reactor, and a gas outlet for discharging the reduced gas, and the composition controlling oxidation reactor comprising a chamber having at a lower part of the chamber, a reduced gas inlet in flow communication with the gas outlet of the reducing reactor, an air inlet and a gas outlet, provided at an upper part of the oxidation reactor, for discharging a composition-controlled gas suitable for the Claus reaction.

3. An apparatus for treating a sulfur dioxide-containing gas, comprising, in combination, a reducing reaction means and a composition controlling oxidation reaction means, in which the sulfur dioxide-containing gas is reduced and a part of the resulting sulfur and hydrogen sulfide is then oxidized to convert the composition of the gas into that suitable for the Claus reaction, wherein:

the reducing reaction means comprises a reaction chamber provided in a reactor having at a lower part of the reaction chamber a feed pipe for a sulfur dioxide-containing gas and a reducing gas thereof, a fire grate, a reducing packing supported by the fire grate and a heating means, and the composition controlling oxidation reaction means comprising a combustion chamber provided above and in flow communication with said reaction chamber in the same reactor, an air inlet for feeding air to said combustion chamber to oxidize the reduced gas and a gas outlet for discharging a composition-controlled gas suitable for the Claus reaction.

4. An apparatus for treating a sulfur dioxide-containing gas, comprising, in combination, a reducing reaction means and a composition controlling reaction means, in which the sulfur dioxide-containing gas is reduced and a part of the resulting sulfur and hydrogen sulfide is then oxidized to convert the composition of the gas into that suitable for the Claus reaction, wherein:

the reducing reaction means and composition-controlling oxidation reaction means are respectively a reducing reactor and composition controlling reactor, provided adjacently to each other, and the reducing reactor comprising a chamber having at a lower part of the chamber, a feed pipe for the sulfur dioxide-containing gas and a reducing gas thereof, a fire grate, a reducing packing supported by the fire grate and a heating means, and at an upper part of the chamber, a gas outlet for discharging the reduced gas and the composition controlling oxidation reactor comprising a chamber having a lower part of the chamber, a reduced gas inlet in flow communication with the gas outlet of the reducing reactor and an air inlet, and at an upper part of the chamber, a gas outlet for discharging a composition-controlled gas suitable for the Claus reaction.

* * * * *